(12) United States Patent
Zhu et al.

(10) Patent No.: US 7,521,921 B2
(45) Date of Patent: Apr. 21, 2009

(54) DISPLACEMENT SENSOR

(75) Inventors: Haihong Zhu, Atlanta, GA (US); Wayne J. Book, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 379 days.

(21) Appl. No.: 11/259,665

(22) Filed: Oct. 26, 2005

(65) Prior Publication Data

US 2006/0087314 A1    Apr. 27, 2006

Related U.S. Application Data

(60) Provisional application No. 60/622,285, filed on Oct. 26, 2004.

(51) Int. Cl.
*G01B 7/14* (2006.01)
*G01B 7/30* (2006.01)

(52) U.S. Cl. .................. 324/207.17; 324/207.24; 324/658

(58) Field of Classification Search ............ 324/207.12, 324/207.15–207.19, 207.22, 207.24–207.25, 324/225, 658, 659, 686
See application file for complete search history.

(56) References Cited

U.S. PATENT DOCUMENTS

| 2,273,760 | A | 2/1942 | Nelson |
| 2,780,702 | A | 2/1957 | Bourns |
| 2,813,183 | A | 11/1957 | Gearheart et al. |
| 2,831,094 | A | 4/1958 | Bourns et al. |
| 2,902,663 | A | 9/1959 | Abatemarco et al. |
| 2,909,750 | A | 10/1959 | Pitzer |
| 3,026,493 | A | 3/1962 | Treff |
| 3,029,404 | A | 4/1962 | Huard |
| 3,071,758 | A | 1/1963 | Wolfendale |
| 3,296,522 | A | 1/1967 | Wolfendale |
| 3,478,256 | A | 11/1969 | Tomota ................. 321/2 |
| 3,566,222 | A | 2/1971 | Wolfendale et al. ......... 317/246 |
| 3,928,796 | A | 12/1975 | Kaiser ..................... 324/61 |

(Continued)

FOREIGN PATENT DOCUMENTS

DE    1515353    8/1975

(Continued)

OTHER PUBLICATIONS

"PSP—the Non-Contacting Potentiometer Concept," Novotechnik Siedle Group; http://www.novotechnik.com/pdfs/PSP.pdf. 1 page undated.

*Primary Examiner*—Reena Aurora
(74) *Attorney, Agent, or Firm*—Thomas, Kayden, Horstemeyer & Risley, LLP

(57) ABSTRACT

Sensors and methods for measuring displacement are disclosed. In one embodiment, among others, a resistive element is configured to receive an alternating voltage between a first electrical terminal and a second electrical terminal, the first and second electrical terminals defining a length of the resistive element. A signal pickup is capacitively coupled to the resistive element and is configured to be moved along the length of the resistive element at a substantially fixed distance from the resistive element and without contact between the resistive element and the signal pickup. A shielded cable, such as a coaxial cable, electrically connected to the signal pickup carries a signal having an amplitude proportional to the position of the signal pickup with respect to the first and second electrical terminals.

40 Claims, 4 Drawing Sheets

U.S. PATENT DOCUMENTS

| | | | |
|---|---|---|---|
| 4,058,765 A | 11/1977 | Richardson et al. | 324/61 |
| 4,206,401 A | 6/1980 | Meyer | 324/61 |
| 4,237,443 A | 12/1980 | Gass | 338/202 |
| 4,284,969 A | 8/1981 | Carbonneau | 338/183 |
| 4,288,793 A | 9/1981 | Lotscher | 340/870.37 |
| 4,395,695 A | 7/1983 | Nakamura | 338/32 |
| 4,420,273 A | 12/1983 | Blessing | 403/24 |
| 4,420,754 A | 12/1983 | Andermo | 340/870.37 |
| 4,423,406 A | 12/1983 | Nakano | 338/32 |
| 4,425,557 A | 1/1984 | Nakamura | 338/32 |
| 4,473,814 A | 9/1984 | Blessing | 338/176 |
| 4,523,514 A | 6/1985 | Burk | 92/5 |
| 4,584,885 A | 4/1986 | Cadwell | 73/862.61 |
| 4,587,850 A | 5/1986 | Moser | 73/658 |
| 4,656,457 A | 4/1987 | Brausfeld et al. | 338/176 |
| 4,748,434 A | 5/1988 | Gass | 338/176 |
| 4,837,500 A | 6/1989 | Abbringh | 324/61 |
| 4,879,508 A | 11/1989 | Andermo | 324/61 |
| 4,961,055 A | 10/1990 | Habib et al. | 324/662 |
| 4,966,041 A | 10/1990 | Miyazaki | 73/862.33 |
| 5,049,827 A | 9/1991 | Tasma | 324/723 |
| 5,072,206 A | 12/1991 | Kozuka | 338/184 |
| 5,079,500 A * | 1/1992 | Oswald | 323/364 |
| 5,089,783 A | 2/1992 | Kapsokavathis et al. | 324/672 |
| 5,172,039 A | 12/1992 | Owens | 318/489 |
| 5,386,195 A | 1/1995 | Hayes et al. | 324/662 |
| 5,461,319 A | 10/1995 | Peters | 324/714 |
| 5,525,955 A | 6/1996 | Tonogai et al. | 338/185 |
| 5,627,325 A | 5/1997 | Lew et al. | 73/861.56 |
| 5,642,043 A | 6/1997 | Ko et al. | 324/207.24 |
| 5,684,407 A | 11/1997 | Zdanys, Jr. et al. | 324/714 |
| 5,796,183 A | 8/1998 | Hourmand | 307/116 |
| 5,812,048 A | 9/1998 | Ross, Jr. et al. | 338/128 |
| 5,815,091 A | 9/1998 | Dames et al. | |
| 5,886,617 A | 3/1999 | Meloche et al. | 338/176 |
| 6,002,250 A | 12/1999 | Masreliez et al. | 324/207.16 |
| 6,057,692 A | 5/2000 | Allmendinger et al. | 324/660 |
| 6,118,283 A | 9/2000 | Cripe | 324/660 |
| 6,160,395 A | 12/2000 | Goetz et al. | 324/207.21 |
| 6,246,230 B1 | 6/2001 | Mednikov | |
| 6,295,881 B1 | 10/2001 | Stewart et al. | 73/866.5 |
| 6,304,091 B1 | 10/2001 | Shahoian et al. | 324/662 |
| 6,313,730 B1 | 11/2001 | Ohara et al. | 338/176 |
| 6,450,006 B1 | 9/2002 | Dougherty | 73/19.1 |
| 6,492,911 B1 | 12/2002 | Netzer | 340/870.37 |
| 6,499,368 B2 | 12/2002 | Arms et al. | 73/866.15 |
| 6,573,708 B1 | 6/2003 | Hiramatsu et al. | 342/207.17 |
| 6,639,544 B2 | 10/2003 | Yamada et al. | 342/71 |
| 6,642,857 B1 | 11/2003 | Schediwy et al. | 341/20 |
| 6,661,240 B1 | 12/2003 | Johnson et al. | 324/662 |
| 6,708,123 B2 | 3/2004 | Gerrish | 702/60 |
| 6,820,028 B2 | 11/2004 | Ye et al. | 702/117 |
| 6,828,801 B1 | 12/2004 | Burdick et al. | 324/658 |
| 6,894,509 B2 | 5/2005 | Johnson et al. | 324/662 |
| 2003/0199349 A1 | 10/2003 | Sands et al. | 474/106 |
| 2004/0004473 A1 | 1/2004 | Gassman et al. | 324/207.24 |
| 2004/0032255 A1 | 2/2004 | Berndt | 324/207.25 |
| 2004/0182168 A1 | 9/2004 | Mallory | 73/780 |

FOREIGN PATENT DOCUMENTS

| | | |
|---|---|---|
| EP | 0078411 | 5/1983 |
| EP | 0159372 | 10/1985 |
| EP | 302670 | 2/1989 |
| EP | 0 592 849 A1 | 1/1990 |
| EP | 0877231 | 11/1998 |
| GB | 2228835 | 9/1990 |
| JP | 55088960 | 7/1980 |
| JP | 59197805 | 11/1984 |
| JP | 62014002 | 1/1987 |
| JP | 01235814 | 9/1989 |
| JP | 02027201 | 1/1990 |
| JP | 02150716 | 6/1990 |
| JP | 07332912 | 12/1995 |
| JP | 08210830 | 8/1996 |
| JP | 11030531 | 2/1999 |
| JP | 11108605 | 4/1999 |

* cited by examiner

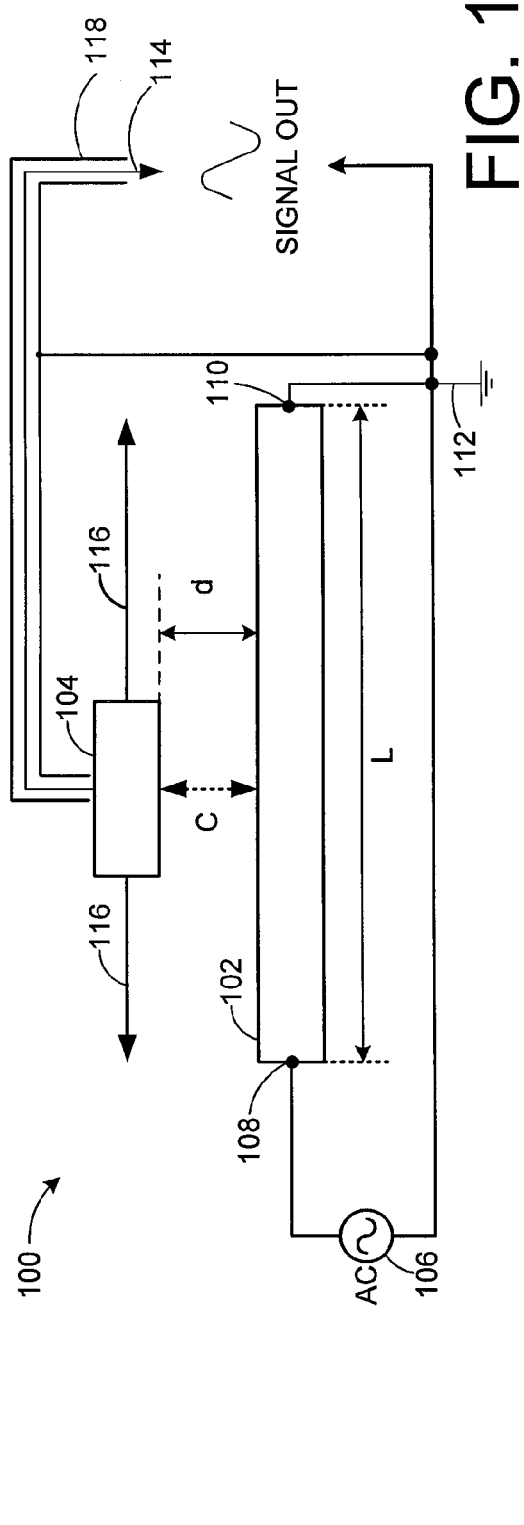
FIG. 1
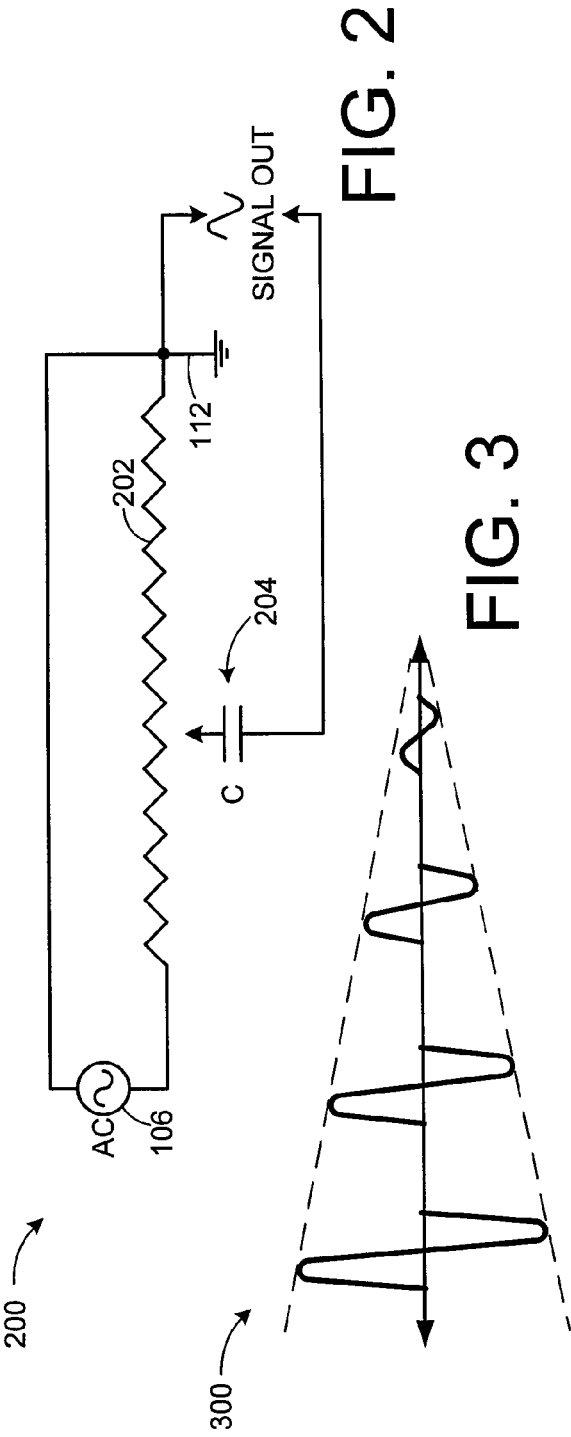
FIG. 2
FIG. 3

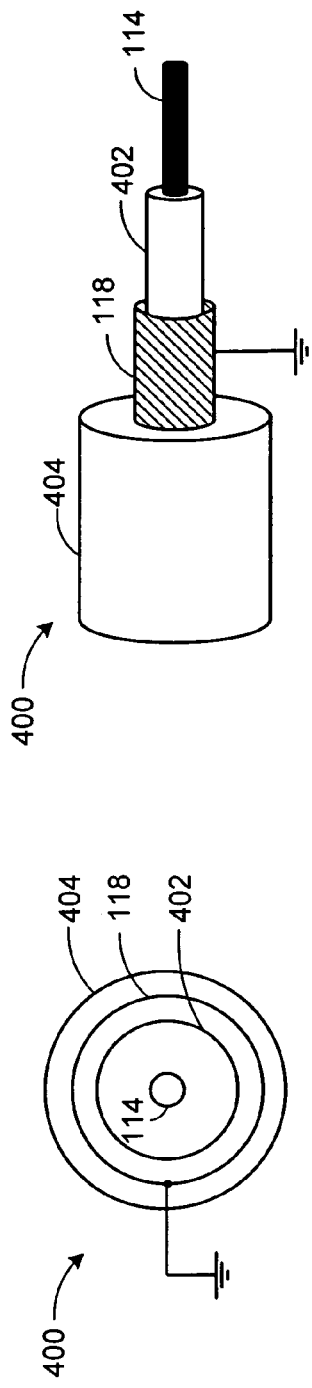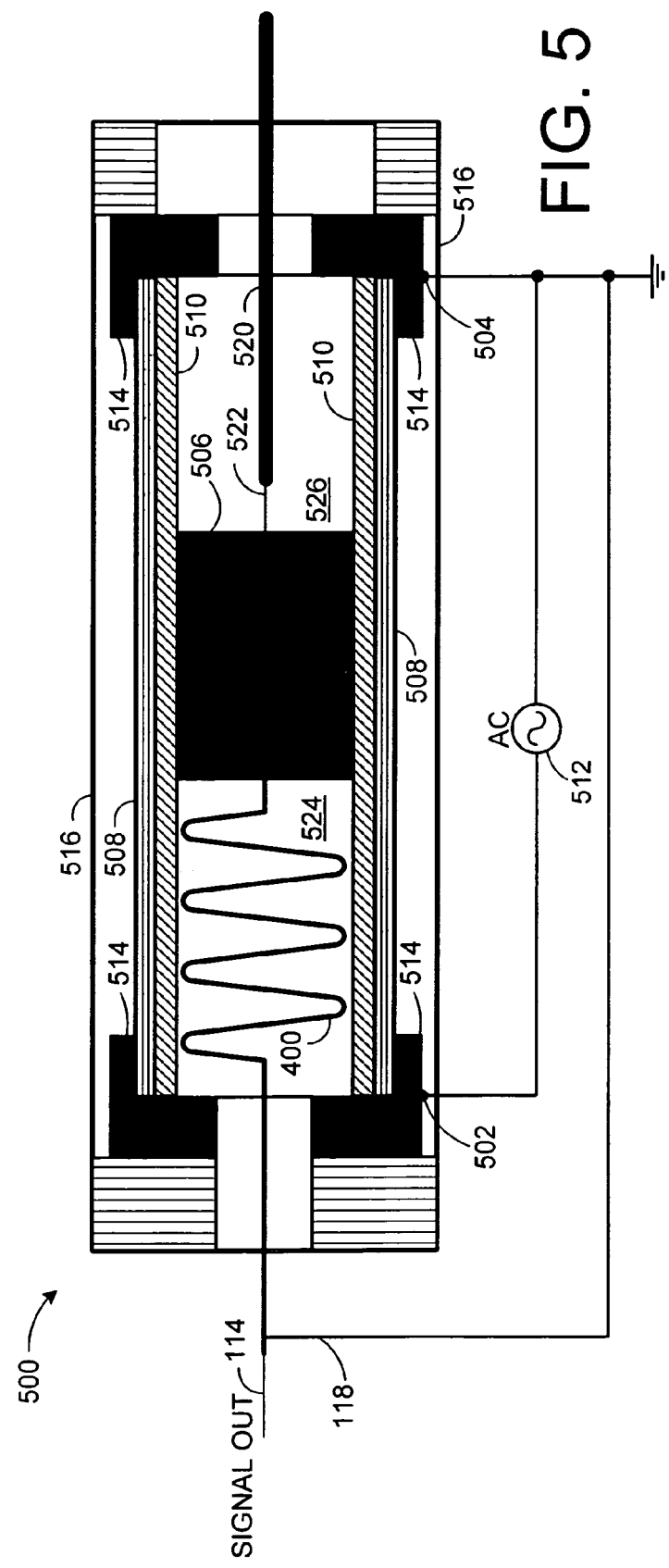

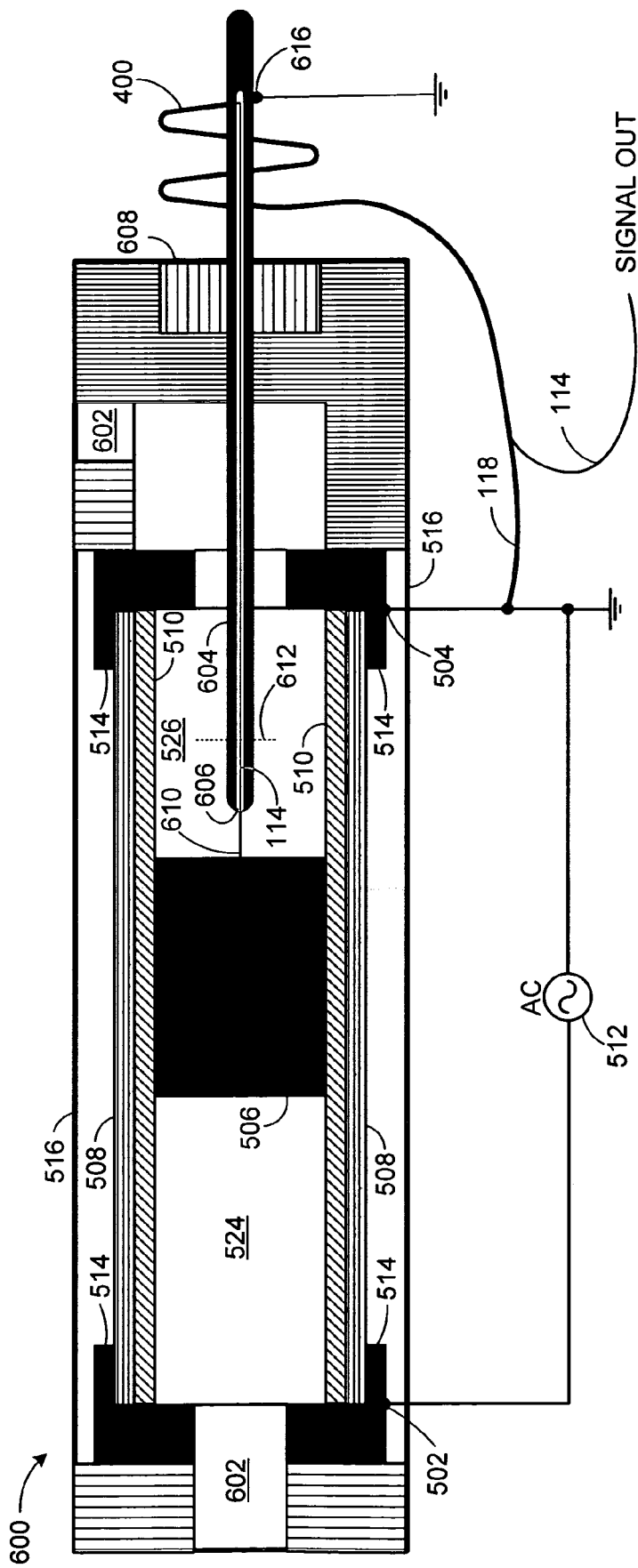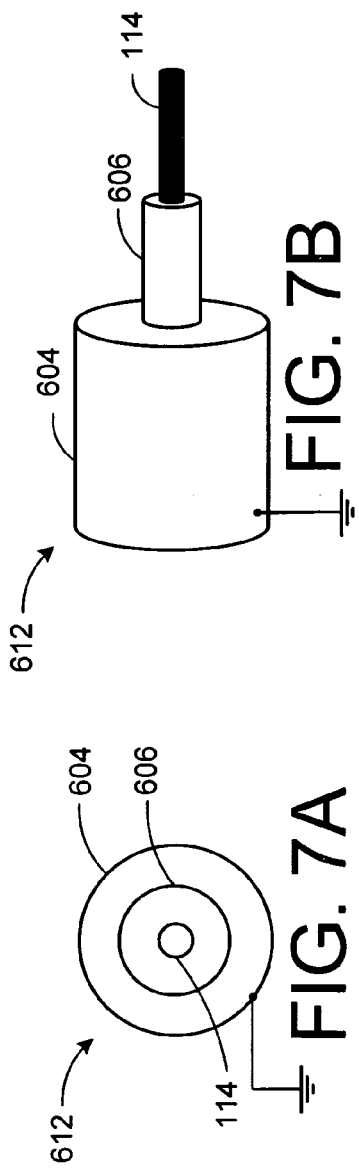
FIG. 6
FIG. 7A
FIG. 7B

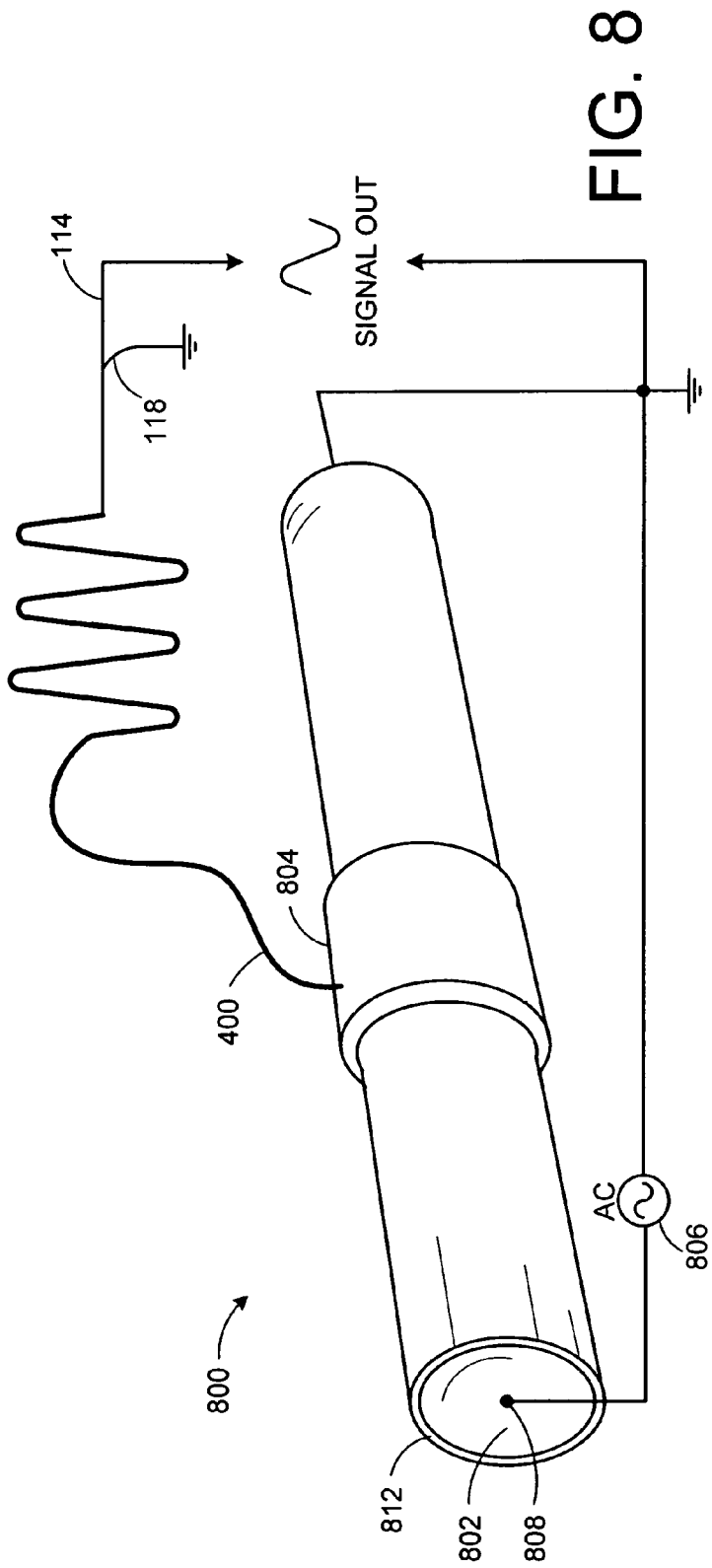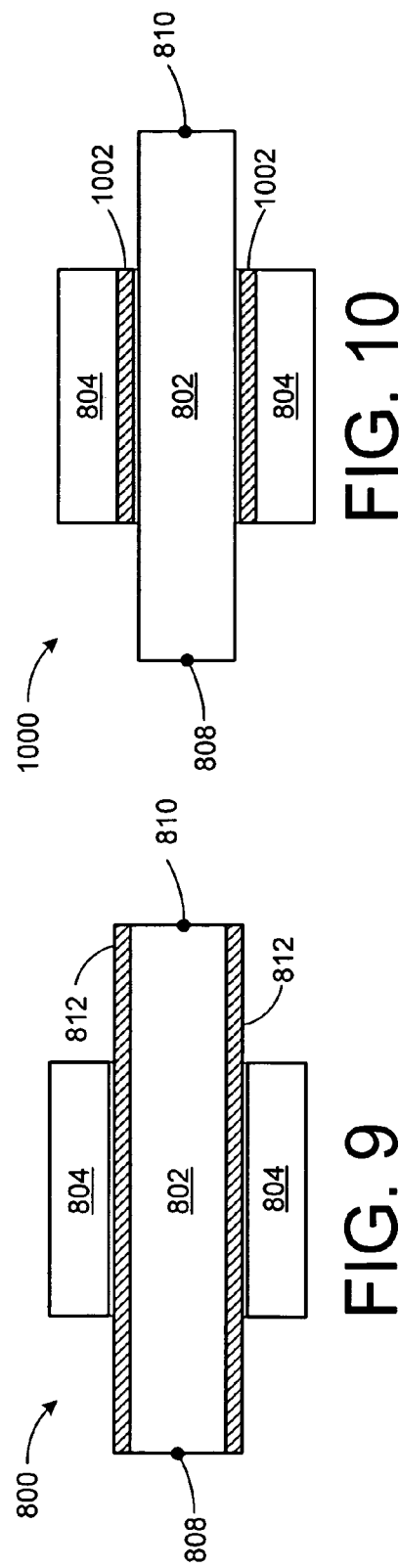

DISPLACEMENT SENSOR

CROSS-REFERENCE TO RELATED APPLICATIONS

This application claims priority to and benefit of U.S. Provisional Patent Application entitled "Displacement Sensor Embedded Cylinder and Novel Displacement Sensor," assigned Ser. No. 60/622,285, and filed on Oct. 26, 2004, which is incorporated by reference in its entirety.

STATEMENT REGARDING FEDERALLY SPONSORED RESEARCH OR DEVELOPMENT

The U.S. Government may have a paid-up license in this invention and the right in limited circumstances to require the patent owner to license to others on reasonable terms as provided for by the terms of Contract No. NS-0121663, awarded by the National Science Foundation.

BACKGROUND

1. Technical Field

The present disclosure generally relates to displacement sensors, and more specifically, to non-contacting displacement sensors.

2. Description of the Related Art

Displacement sensors can be widely used in a number of industrial applications. Conventional displacement sensors have a variety of structures and working principles. For example, conventional displacement sensors include contacting potentiometers (e.g. resistance sensors), inductance sensors (e.g. Linear Variable Differential Transformer (LVDT) sensors and eddy current sensors), and non-contacting potentiometer displacement sensors.

A contacting potentiometer has a simple and low-cost structure. However, because this type of sensor includes a moving wiper that constantly contacts a resistive surface, a contacting potentiometer suffers from a limited life span, poor environmental resistance, and a degradation of the output signal over the sensor's lifetime.

An inductance sensor, on the other hand, is a type of non-contacting sensor, and thus does not suffer from the drawbacks of the contacting potentiometer. The most widely used inductance sensor is an LVDT sensor, which is extremely precise and can have a long useful lifetime. However, to improve linearity, LVDT sensors typically include three electromagnetic coils. These coils can be difficult and costly to manufacture. In addition, the plunger is comprised of ferrite material which exhibits poor resistance to some environments, such as acidic environments.

One embodiment of a non-contacting potentiometer sensor is described on the world-wide web page of Novotechnik of Ostfildern, Germany (http://www.novotechnik.com/). The structure consists of two parallel tracks and a moveable element for capacitively coupling the tracks. The two tracks consist of a first resistive track and a second low ohm collector track. An alternating current (AC) power source supplies a voltage across the resistive track. As the moveable element translates across the two tracks, evaluating electronics pick up a voltage signal from the collector track. However, the device suffers from a coupling capacitance between the collector track and the resistive track, as well as stray capacitance, which corrupts the output signal. Novotechnik apparently sells a device which uses a feedback loop to adjust the supply voltage signal in an attempt to compensate for the coupling capacitance. However, the device can be complicated to manufacture and does not completely account for the interference from stray capacitance and capacitive coupling between the resistive and collective tracks.

Another approach is described in U.S. Pat. No. 5,079,500 (the '500 patent), which describes yet another non-contacting potentiometer circuit arrangement. The potentiometric circuit arrangement is based on a resistive potentiometer track and a capacitively coupled wiper. The resistive track is driven by switched alternating voltages of +/−V and −/+(X−V), where X is a reference voltage and V is the output of an integrator to which the voltage sensed by the wiper, and rectified, is applied. A null voltage point establishes itself at the position of the wiper and stabilizes the integrator output at a direct current (DC) voltage proportional to the distance of the wiper from the track end. Any wiper displacement taps a non-null signal which, integrated, applies new voltages to the track until the null point is re-established at the wiper position. The circuit arrangement partially accounts for signal noise through the use of a feedback loop for altering the input voltage across the track. In addition, a preamplifier attached to the wiper amplifies the signal to mitigate signal noise induced by electromagnetic signals from other objects.

Conventional displacement sensors may be used in conjunction with a hydraulic or pneumatic cylinder to determine the displacement of the piston. However, such use typically comprises a standalone displacement sensor in conjunction with a conventional hydraulic or pneumatic cylinder. Therefore, the resulting cylinder structure can be very complex, causing an associated cost of manufacture to be relatively high. Adding the displacement sensor to the hydraulic or pneumatic cylinder can also increase the size of the cylinder, making them impractical for many applications.

Accordingly, what is needed is a non-contacting sensor structure that can achieve a precise output signal with low noise and without the use of a feedback circuit to account for stray and/or coupling capacitance. Further, a non-contacting sensor structure is needed that is simple in construction and does not need a preamplifier attached to the wiper for mitigating signal noise. Additionally, a non-contacting displacement sensor is needed that can inherently be used as a hydraulic or pneumatic cylinder, advantageously resulting in a hydraulic or pneumatic cylinder having the capability of providing a signal that can be used to determine the position of a piston within the hollow cavity of the cylinder, without a substantial increase in size or complexity from conventional hydraulic or pneumatic cylinders.

SUMMARY

One embodiment of a sensor for measuring displacement, among others, includes a resistive element configured to receive an alternating voltage between a first electrical terminal and a second electrical terminal. The first and second electrical terminals define a length of the resistive element. The sensor further comprises a signal pickup capacitively coupled to the resistive element, the signal pickup configured to be moved along at least a portion of the length of the resistive element at a substantially fixed distance from the resistive element and without contact between the resistive element and the signal pickup. The sensor also includes a shielded wire electrically connected to the signal pickup, the shielded wire carrying a signal having an amplitude proportional to a position of the signal pickup with respect to the first and second electrical terminals.

An embodiment of a method for measuring displacement, among others, includes the steps of applying an alternating voltage having a substantially fixed amplitude between a first electrical terminal and a second electrical terminal of a resistive element, the first and second electrical terminals defining a length of the resistive element. The method further includes determining the position of a signal pickup in relation to the length of the resistive element based on an amplitude of an output signal obtained from the signal pickup, the signal pickup being capacitively coupled to, and moveable along, at least a portion of the length of the resistive element.

An embodiment of a cylinder, among others, comprises a cylinder body forming a cylindrical hollow chamber for receiving a fluidic medium, the body comprising at least a resistive layer of a substantially uniform thickness, the resistive layer having a first and a second electrical terminal for receiving an alternating voltage. The cylinder further includes a piston fitted to the inside the of hollow chamber of the cylinder body and capacitively coupled to the resistive layer, the piston configured to be moved along at least a portion of the longitudinal axis of the cylinder body at a substantially fixed distance from the resistive layer and without contact between the resistive layer and the piston. A conducting element electrically connected to the piston for carrying a signal having an amplitude proportional to a position of the piston with respect to the first and second electrical terminals of the resistive layer.

One embodiment of a sensing system, among others, comprises a signal pickup capacitively coupled to a resistive element. The signal pickup is moveable along a length of the resistive element. The system includes a conductive element electrically coupled to the signal pickup for carrying a voltage signal sensed from the signal pickup to a signal output. The system also includes a conductive shield forming a layer around, and insulated from, the conductive element. The conductive shield extends along a length of the conductive element, the length defined by a first position near the signal pickup and a second position near the signal output.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 1 depicts a side view of one embodiment of a non-contacting displacement sensor.

FIG. 2 depicts a simplified circuit diagram of the non-contacting displacement sensor of FIG. 1.

FIG. 3 depicts a simplified representation of the amplitude of the alternating current signal output from the non-contacting displacement sensor of FIG. 1, as the signal pickup moves along the length of the resistive element of FIG. 1.

FIG. 4A depicts a cross-sectional view of an embodiment of a coaxial cable that may be used to shield a wire of the displacement sensor of FIG. 1.

FIG. 4B depicts a longitudinal view of the coaxial cable of FIG. 4A.

FIG. 5 depicts a cut-away, side view of another embodiment of a non-contacting linear displacement sensor having a similar displacement sensing principle of the displacement sensor of FIG. 1.

FIG. 6 depicts a cut-away, side view of another embodiment of a non-contacting displacement sensor similar to that of FIG. 5, comprising an embedded hydraulic or pneumatic cylinder.

FIG. 7A depicts a cross-section view of the rod depicted in FIG. 6, with a view of the embedded insulating tube and wire.

FIG. 7B depicts a longitudinal, cut-away view of the portion of the rod depicted in FIG. 7A.

FIG. 8 depicts a perspective view of another embodiment of a non-contacting displacement sensor having a similar displacement sensing principle of the displacement sensor of FIG. 1.

FIG. 9 depicts a cut-away, side-view of the non-contacting displacement sensor of FIG. 8.

FIG. 10 depicts a cut-away, side-view of another embodiment of a non-contacting displacement sensor having a similar displacement sensing principle of the sensor of FIG. 8.

DETAILED DESCRIPTION

Embodiments of devices and associated methods for measuring displacement are described in detail below with reference to the figures briefly described above. Embodiments are described below as being "non-contacting" displacement sensors. As will become apparent, the term "non-contacting," as referred here and known to those skilled in the art, refers to the lack of contact between a signal pickup and an associated resistive element to which the signal pickup is capacitively coupled. As described in the background, conventional potentiometers include an electrically conductive wiper that is in contact with a resistive track. While being of simple construction, a number of disadvantages of this continual contact preclude their use in many applications. Accordingly, non-contacting sensors, such as Linear Variable Differential Transformer (LVDT) sensors do not include a contacting wiper. However, non-contacting sensors, such as LVDT sensors, may include a signal pickup that moves along a path, and this signal pickup may lightly contact a track or other surface of the displacement sensor. However, this contact is not integral or even desirable to the measurement of the displacement of the sensor. This is also true of the non-contacting displacement sensor embodiments disclosed herein. Rather, reference to the non-contacting aspect of the described sensor embodiments below refer to the non-contact between the signal pickup and its associated resistive element, which creates a capacitive coupling between these respective elements.

Referring now to FIG. 1, a side view of an embodiment of a non-contacting sensor 100 for measuring displacement is depicted. As will become apparent, the general principles of operation of the sensor 100 can be applied to a number of potential sensor embodiments, including those described with respect to FIGS. 5-10.

Sensor 100 generally comprises a resistive element 102, a signal pickup 104, and an alternating voltage source 106. Signal pickup 104 could also be described as a signal pickup head, moveable signal pickup, or a displacement element.

In practice, signal pickup 104 may be connected, (e.g. physically, magnetically, etc.) to another moveable object for measuring the displacement of the moveable object. By determining the movement of the signal pickup 104 along the resistive element 102, the position of the moveable object can be determined. However, in some embodiments, the signal pickup 104 could be incorporated into the moveable object itself.

Resistive element 102 receives an alternating voltage, which may be provided by the alternating current (AC) source 106, between a first electrical terminal 108 and a second electrical terminal 110. Electrical terminals 108 and 110 are electrical contact points (e.g. for a voltage source and/or ground), and are not limited to any specific physical structure. According to the embodiment of FIG. 1, the first terminal 108 is connected to AC source 106, and the second terminal 110 is connected to ground 112.

Terminals 108 and 110 define a length (L) of resistive element 102, along which the signal pickup 104 may move to provide an output signal ("SIGNAL OUT") capable of being used to determine the position of the signal pickup 104 along this length (L). Although FIG. 1 depicts the length (L) as being equal to the physical length of the resistive element 102, the length (L) could be some length less than the total physical length of the element. Additionally, the signal pickup 104 could be configured to move along a portion of the total length of the resistive element 102, between first and second terminals 108 and 110, comprising less than the total length (L). The resistive element 102 may be selected and/or configured to provide a substantially uniform resistance across the length (L).

Signal pickup 104 is positioned a distance (d) above the resistive element, and without contact between the resistive element 102 and the signal pickup 104. Preferably this distance is substantially fixed, with only minor variations, thereby providing a substantially constant capacitive coupling (C) between the resistive element 102 and the signal pickup 104. Such displacement can be ensured, for example, by fixing the signal pickup 104 along a track running parallel to the resistive element 102, and/or by providing a substantially uniform dielectric layer (e.g. glass, polymers, ceramics, and/or other insulators) between resistive element 102 and signal pickup 104. An embodiment having a uniform dielectric layer could, for example, be applied to either one of, or both of, the resistive element 102 and the signal pickup 104. Depending on the specific embodiment, the dielectric layer could be in any number of forms, such as, but not limited to, a cylinder, a strip, a core, or a coating.

Signal pickup 104 is moveable along a path 116 defined by at least the portion of the resistive element 102 defined by length (L). According to the embodiment of FIG. 1, this path 116 is depicted as being substantially linear. However, path 116 could potentially be of a number of shapes taken by the resistive element, which could be curved or U-shaped, among others.

Signal pickup 104 is electrically conductive and, upon resistive element 102 being energized with the alternating current, is capacitively coupled to the resistive element 102.

Accordingly, an electrically conductive element such as wire 114, may be electrically connected to signal pickup 104 for picking up the signal sensed by the signal pickup as a result of the capacitive coupling to resistive element 102. Wire 114 may be made flexible to allow movement of signal pickup 104.

FIG. 2 depicts a simplified circuit diagram 200 of sensor 100. Resistor 202 represents the resistive element 102 of FIG. 1.

Capacitor 204 represents the capacitive coupling (C) between signal pickup 104 and resistive element 102. FIG. 3 depicts a simplified representation 300 of the signal detected by the signal pickup 104, transmitted along wire 114, and sensed as the signal output ("SIGNAL OUT") in FIGS. 1 and 2.

As depicted, the signal output is a waveform, and the waveform changes in amplitude in proportion to the position of the signal pickup 104 along the length (L) of the resistive element 102. One skilled in the art would understand that the resistive properties of resistive element 104, as well as the frequency and amplitude of alternating source voltage 106 can be selected to provide a desired waveform distribution.

Accordingly, as the signal pickup 104 moves along the length (L) of the resistive element 102 of FIG. 1, the amplitude of the resulting signal ("SIGNAL OUT") at the signal output may be measured.

Thus, it can be said that the signal pickup 104, and thus the wire 114, carries a signal having an amplitude proportional to the position of the signal pickup with respect to the first and second electrical terminals.

Accordingly, because a 1:1 relationship exists between an associated amplitude of the signal and the position of the signal pickup 104 along the length (L) of the resistive element, the position of the signal pickup 104 along length (L) can be derived. For example, the position could be determined by multiplying the amplitude by a constant, or by using a lookup table that associates the amplitude with a position.

Advantageously, the position of the signal pickup 104 can be instantly determined upon applying the alternating voltage to the resistive element 102. This benefit is unlike other forms of displacement measuring devices, such as linear encoders that lose their current position with respect to some other fixed position upon losing power.

FIG. 3, however, depicts the output signal of sensor 100 in a perfect circuit. That is, the exemplary signal is not depicted as suffering from potential signal defects that could be caused by, for example, stray capacitance or RF interference from AC source 106 and/or other objects or electrical devices near the sensor.

In particular, interference can be introduced to the signal transmitted through wire 114, between the signal pickup 104 and the point at which the wire is tapped to measure the signal output ("SIGNAL OUT").

Interference from stray capacitance and RF are the subject of the device of U.S. Pat. No. 5,079,500 which attempts to resolve such problems through the addition of bulky and relatively complex circuitry, as explained in the Background of the present disclosure.

However, according to embodiments of the described non-contacting sensor 100, wire 114 may be shielded from electrostatic interference between the signal pickup 104 and the measurement point of the signal output along wire 114. For example, the wire 114 may be a conducting wire of a shielded electrical cable.

The shielded electrical cable may, for example, include a electrically conductive shield 118 (FIG. 1).

The shielded electrical cable may, for example, be a coaxial cable. Although any number of coaxial cable embodiments may be used, an exemplary embodiment of a coaxial cable suitable for use with the embodiments described herein is depicted in FIGS. 4A and 4B. FIG. 4A provides a cross-sectional view, while FIG. 4B provides a longitudinal view.

Looking to FIGS. 4A and 4B, coaxial cable 400 may comprise the conducting wire (e.g. wire 114) surrounded by a number of layers. For example, conducting wire 114 may be surrounded by an insulating (non-conductive) layer 402. Insulating layer 402 may be further surrounded by conductive shield 118, which may then be surrounded by an outer protective jacket 404. The conductive shield 118 may include an electrical terminal for connection to ground, thereby providing the electrical shielding.

Conductive shield 118 could be in the form of a sheath or a spiral shield. The spiral shield may include a right hand spiral or a left hand spiral. A metalized copper tape may be applied over the shield to provide further EM shielding.

Because the signal pickup 104 is moveable along the resistive element 102 (which is stationary with respect to signal pickup 104), coaxial cable 400 may be of the highly-flexible type, allowing the cable to be easily coiled and/or bent while the signal pickup element translates. The material of the protective jacket can be selected to release stress and reduce fatigue failure when coaxial cable 400 bends. In addition, according to embodiments in which conducting shield 118 is a spiral shield, the direction of the spiral can be chosen according to the cable coil direction to reduce fatigue. For example, a right-hand spiral shield can be used if the cable is coiled left and working in a compression spring style, or a left-hand spiral shield can be used if the cable is to be coiled left-hand and working in an extension spring style, etc.

Accordingly, coaxial cable 400 provides electrostatic shielding of its conducting wire from the signal pickup to a position along wire 114 used to tap the resulting signal.

Such an embodiment does not require additional circuitry associated with the signal pickup (e.g. an amplifier), nor does it require a feedback loop for altering the characteristics of the alternating voltage applied to resistive element 102. Rather, the alternating voltage signal applied to the first and second electrical terminals 108 and 110 can be held constant and not varied depending on the sensed signal from the signal pickup.

Although wire 114 is depicted as being shielded by conductive shield 118, some embodiments may not require the use of an electrical shield at all. Additionally, portions of wire 114 may be shielded from EM interference using other shielding devices or methods.

Now that the basic principles of a non-contacting displacement sensor have been described with respect to the embodiments of FIGS. 1-3, another embodiment of a non-contacting linear displacement sensor having a similar working principle of the displacement sensor of FIG. 1 is described with respect to FIG. 5. Specifically, FIG. 5 depicts a cut-away, side-view of a cylindrical displacement sensor 500.

Like the embodiment of FIG. 1, cylindrical displacement sensor 500 is capable of producing a signal ("SIGNAL OUT") that can be used to represent the location of a signal pickup along a length defined by a portion of the resistive element between first and second electrical terminals defining the length of the resistive element. However, according to the embodiment of sensor 500, the signal pickup is an electrically conductive piston 506 and the resistive element is a resistance film 508 applied to the outer surface of an electrically non-conductive hollow tube 510. Electrically non-conductive tube 510 may be, for example, a glass tube. The resistance film 508 may be applied such that it is of axially uniform thickness on the outer surface of tube 510. Thus, the resistance film 508 can also be said to be in the shape of a hollow tube of slightly larger diameter than the tube 510.

The resistance film 508 and the piston 506 are spaced at a substantially fixed distance by an insulating layer, which may be provided by the electrically non-conductive tube 510. The diameter of the piston 506 is sized to be slightly smaller than the diameter of the inner surface of non-conductive tube 510. The diameter of the piston 506 with respect to that of the inner surface of non-conductive tube 510 may, for example, provide a small gap between the outer surface of the piston 506 and the inner surface of the tube 510, such that the piston 506 is loosely fitted and easily slides along the inner surface of non-conductive tube 510 while still maintaining a substantially constant distance from the resistive film 508.

An AC source 512, providing the input signal, is coupled across electrical terminals 502 and 504 of the electrically conductive cushions 514 located on each side of the tube 510. Thus, AC source 512 provides an alternating voltage to resistive film 508 through electrical terminals 502 and 504 of electrically conductive cushions 514. The contact points between the electrically conductive cushions 514 and the resistive film 508 comprise the electrical terminals of the resistive film, to which the alternating voltage input signal is passed. Cushions 514 also provide some physical protection between a protective shell 516 and the tube 510. The protective shell 516 may be formed from metal, polymer or other high strength material. The outside of the shell can be electrically conductive for grounding.

Piston 506 is electrically conductive and, upon resistive film 508 being energized with the alternating voltage, is capacitively coupled to the resistive film 508. Accordingly, an electrically conductive element such as wire 114, may be electrically connected to piston 506 for picking up the signal sensed by piston 506 as a result of the capacitive coupling to resistive film 508.

As described with respect to the sensor 100 of FIG. 1, at least a portion of the wire 114 may be electrically shielded. For example, one embodiment shields wire 114 using the conductive shield 118 of a coaxial cable. (See, FIGS. 4A and 4B, for example). Accordingly, FIG. 5 depicts wire 114 as the conducting wire of a coaxial cable 400. This can be particularly important for portions of wire 114 located within the tube formed by resistive layer 508, because the wire 114 is subject to stray electrical signals introduced across resistive film 508, among others. Accordingly, the conductive shield 118 of the coaxial cable may be connected to ground, thereby insulating wire 114 from interference. Wire 114 (and thus, coaxial cable 400) may be coiled inside tube 510 such that piston 506 can move freely.

A rod 520 may be connected to piston 506. Rod 520 includes a portion extending from the cylindrical body of the sensor 500. Pressure applied to the rod 520 is translated to the piston 506, causing piston 506 to move along the length of the tube 510 and resistive film 508. Although rod 520 may be connected directly to piston 506, according to some embodiments an insulating element may be positioned between the rod and the piston to provide electrical isolation between the piston and the rod.

For example, according to the embodiment of FIG. 5, rod 520 is connected to piston 506 through a flexible element 522. The flexible element 522 may be made of insulating material to provide electrical isolation between piston 506 and rod 520 to decrease stray electrical signals that could be introduced from rod 520. Flexible element 522 may, for example, be difficult to compress along its longitudinal axis (e.g. the same axis along which piston 506 moves), but allows for small misalignment between rod 520 and piston 506, thereby potentially reducing the friction caused by misalignment between the piston 506 and the tube 510.

The resulting sensor 500 has an equivalent circuit as described with respect to the circuit of FIG. 2, and the output signal ("SIGNAL OUT") will follow a distribution similar to that described and depicted in FIG. 3.

The hollow chamber inside the cylindrical body of sensor 500 is split between a rear cavity 524 and a front cavity 526, the cavities being separated by the piston 506. Although FIG. 5 depicts coaxial cable 400 being positioned within rear cavity 524, it should be understood that coaxial cable 400 (and therefore wire 114) can be attached to any location on the piston 506. Accordingly, for example, the wire 114 could be electrically connected to the surface of piston 506 facing front cavity 526, and a portion of the cable 400 could be positioned within the front cavity and routed out of the cylinder body of sensor 500 through a hole in a wall of the sensor (e.g. with the rod).

Additionally, according to some embodiments, the electrically non-conductive tube 510 with the resistive film 508 could be replaced by a hollow tube constructed of resistive material. According to such an embodiment, the surface of piston 506 can be electrically insulated (e.g. with a layer of glass) from the hollow tube of resistive material to provide the capacitive coupling between the piston and the hollow tube of resistive material.

FIG. 6 depicts a cut-away, side view of another embodiment of a non-contacting linear displacement sensor similar to that of FIG. 5, comprising an embedded hydraulic or pneumatic cylinder 600. A number of features correspond to features already described with respect to FIG. 5, and thus bear the same reference number. It should be understood that embodiments described with respect to sensor 500 are equally applicable to the cylinder 600. However, different from the embodiment of sensor 500, cylinder 600 depicts that one or more ports 602 for a receiving a fluidic medium can be included, which should be understood to include liquids and gasses, such as hydraulic fluid and/or air. Such an embodiment could be used with, for example, pneumatic actuators or shock absorbers, among others.

As mentioned above with respect to sensor 500, wire 114 can be routed through the front chamber 526 instead of rear chamber 524. FIG. 6 depicts one such example in which the conducting wire 114 is routed with a cylinder rod 604 to a portion of the cylinder rod extending outside of the body of the cylinder 600. To isolate the fluidic medium from the outside of the cylinder 600, a graphite seal ring 608 may be included to provide a seal between the cylinder rod 604 and the cylinder body.

Although wire 114 may be directly connected to piston 506, according to the embodiment of cylinder 600, a short flexible wire 610 may be positioned between piston 506 and wire 118. The short flexible wire 610 is made electrically conductive to provide an electrical connection between piston 506 and wire 114. Like the flexible element 522 of sensor 500, the short flexible wire 610 is difficult to compress along its longitudinal axis (e.g. the same axis along which piston 506 moves), but allows for small misalignment between the rod and piston, thereby potentially reducing the friction caused by misalignment between the piston and the tube 510.

According to embodiments similar to those described with respect to sensor 500, wire 114 may be electrically shielded and a coaxial cable may extend from the flexible wire, or directly from piston 506, and run along, or be embedded within, cylinder rod 604. Cylinder rod 604 may be made hollow or include a cooperative groove for this purpose. As with the other embodiments using coaxial cables described herein, the wire 114 is shielded by the conductive shield of the coaxial cable.

According to the embodiment depicted in FIG. 6, the cylinder rod 604 itself may be used as the electrical shield for the conducting wire 114 by itself, or in addition to other shielding such as a coaxial cable. Specifically, by way of example, cylinder rod 604 may be coaxially fitted with a hollow tube 606, which may be formed from a non-conductive material (e.g. plastic, glass, etc.). The wire 114 may be coaxially fitted into the hollow interior of hollow tube 606. The cylinder rod 604 may be electrically conductive to form the protective shield similar to that provided by the conducting shield of a coaxial cable. Accordingly, the cylinder rod 604 may also include a terminal 616 for connecting the rod 604 to ground.

FIG. 7A depicts a cross section of rod 604, taken along broken line 612, while FIG. 7B provides a cut-away longitudinal view. FIGS. 7A and 7B depict hollow cylinder rod 604 (forming the conductive shield), hollow tube 606 coaxially fitted within hollow cylinder rod 604 (providing an insulating function), and wire 114 coaxially fitted within the hollow tube 606 (for transmitting the signal from the piston).

Looking back to FIG. 6, at a position along the length of cylinder rod 604, the wire 114 may be routed outside of the cylinder rod 604. Because wire 114 is no longer electrically shielded by the cylinder rod 604, a portion of the wire 114 routed outside of the cylinder rod 604 may be shielded from electrostatic interference. For example, again, coaxial cable 400 may be used for this shielding. Accordingly, the conductive shield 118 of coaxial cable 400 may be connected to ground and the wire 114 may be tapped for measuring the output signal ("SIGNAL OUT").

The displacement sensing principles are the same as described with respect to the sensor of FIG. 5. Accordingly, after applying an alternating voltage across the resistive film 508, the amplitude of the signal detected from the wire 114 can be used to determine the position of the piston 506 along the length of the resistive film 508.

It should be understood that according to some embodiments, the electrically non-conductive tube 510 with the resistive film 508 could be replaced by a tube comprising a resistive material. According to such an embodiment, the surface of piston 508 could be electrically insulated (e.g. with a layer of glass or other insulator) from the tube of resistive material to provide the capacitive coupling between the piston and the resistive tube.

Additionally, embodiments using the sensor rod 604 as the conductive shield also apply to the embodiments of cylindrical displacement sensor 500. For example, as with the cylinder 600, the rod 520 of sensor 500 can be made hollow and made from conductive material. The flexible element 522 of sensor 500 can be made conductive and the signal conducting wire 114 can be attached to the flexible wire and routed coaxially through rod 520. Accordingly, wire 114 can be isolated from the rod 520 with an insulator (e.g. a glass tube, air gap, and/or rubber ring). The rod 520 can be linked to the output signal ground for shielding and the signal on conducting wire 114 can be tapped for measuring.

Accordingly, as described above with respect to sensor 500, it should also be understood that the position of the conductive wire within the cylinder (e.g. in the front chamber 526 or rear chamber 524) and/or the attachment point to the piston can be varied. For example, cylinder 600 may include an embodiment in which the conducting wire is attached to, and positioned on, a surface of the piston 506 in the rear chamber 524. Wire 114, which may be the conducting wire of coaxial cable 400, may then be routed outside of the cylinder 600 (e.g. through port 602 or a wall of the cylinder).

According to yet another embodiment of displacement sensor 500 and/or cylinder 600, the insulating layer between the piston and resistive layer could be provided by one or more non-conductive (e.g. rubber) O-rings. For example, a first o-ring may be secured close to a first end of the piston and a second o-ring may be secured to a second end of the piston, both o-rings positioned between the piston and the inner cylinder wall. The first and second o-rings may provide both a seal between the piston and the hollow chamber, as well as the insulator for the capacitive coupling between the piston and the resistive element. Such an embodiment could be used with, or without, an additional insulation layer.

FIG. 8 depicts a perspective view of an embodiment of a rod-and-collar non-contacting displacement sensor 800 having a similar displacement measuring principle to the displacement sensor 100 of FIG. 1. However, the resistive element of sensor 800 comprises a resistive rod 802 capacitively coupled to a signal pickup comprising a displacement collar 804.

Resistive rod 802 may be in a number of shapes, such as the cylinder depicted in FIG. 8. Resistive rod 802 may be comprised completely of resistive material, or may include a substantially uniform layer of resistive material coating its outer surface. An alternating voltage, supplied by AC source 806, is provided to first and second electrical terminals 808 and 810 (See FIG. 9) of the resistive rod 802.

The resistive rod 802 is capacitively coupled to the displacement collar through an insulating layer 812. According to some embodiments, the insulating layer 812 may be deposited in a substantially uniform thickness along the surface of resistive rod 802. For example, FIG. 9 depicts cut-away, side-view of the non-contacting displacement sensor of FIG. 8, showing insulating layer 812 as being formed on the resistive rod 802. According to some embodiments, as depicted with respect to the rod-and-collar sensor 1000 of FIG. 10, an insulating layer 1002 may be formed on the inner surface of the displacement collar 804. The insulating layer may also be applied to both the resistive rod 802 and the displacement collar 804.

Looking back to FIG. 8, wire 114 may be electrically connected to displacement collar 804 for picking up the signal sensed by the displacement collar 804 as a result of the capacitive coupling to resistive rod 802. As with previously described embodiments, wire 114 may be shielded from electrostatic interference with conductive shield 118. For example, wire 114 may be the conducting wire of coaxial cable 400, and the conducting sheath 118 of the coaxial cable 400 may be connected to an electrical ground.

The displacement sensing principles are the same as that described with the sensor of FIG. 1. Accordingly, after applying an alternating voltage across the resistive rod 802, the amplitude of the signal ("SIGNAL OUT") detected from the wire 114 can be used to determine the position of the displacement collar 804 along a length of the resistive rod 802, between terminals 808 and 810.

It should be emphasized that many variations and modifications may be made to the above-described embodiments. All such modifications and variations are intended to be included herein within the scope of this disclosure and protected by the following claims Therefore, at least the following is claimed:

1. A sensor for measuring displacement comprising:
    a cylindrical resistive element configured to receive an alternating voltage between a first electrical terminal and a second electrical terminal, the first and second electrical terminals defining an axial length of the resistive element;
    a signal pickup capacitively coupled to the resistive element, the signal pickup configured to be moved along at least a portion of the axial length of the resistive element at a substantially fixed distance from the resistive element and without contact between the resistive element and the signal pickup; and
    a shielded wire electrically connected to the signal pickup, the shielded wire configured to carry a signal obtained from the signal pickup, the signal having an amplitude proportional to an axial position of the signal pickup with respect to the first and second electrical terminals.

2. The sensor of claim 1, wherein the resistive element and the signal pickup are spaced at the substantially fixed distance by an insulating layer.

3. The sensor of claim 1, wherein the first terminal is a voltage source and the second terminal is an electrical ground.

4. The sensor of claim 1, wherein the alternating voltage applied between the first and second terminals oscillates at a fixed frequency and amplitude.

5. The sensor of claim 1, wherein the resistive element is in the shape of a hollow tube and the signal pickup is in the shape of a cylinder, the signal pickup configured to move axially along a portion of the inside of the hollow tube shaped resistive element.

6. The sensor of claim 5, wherein the resistive element and the signal pickup are spaced at the substantially fixed distance by an insulator.

7. The sensor of claim 6, wherein the insulator is an axially uniform layer of nonconductive material coating the signal pickup.

8. The sensor of claim 6, wherein the insulator is a nonconductive tube and the resistance element is an axially uniform layer of resistive material coating the nonconductive tube.

9. The sensor of claim 6, wherein the sensor further includes a hollow rod having a first portion located within the hollow tube and attached to the signal pickup, and a second portion extending outside of the hollow tube, the rod configured to move axially with the signal pickup, and wherein a first portion of the shielded wire is positioned inside the first and second portions of the hollow rod, and a second portion of the shielded wire extends outside of the hollow rod.

10. The sensor of claim 9, wherein the rod is electrically conductive and grounded to provide electrostatic shielding to the shielded wire.

11. The sensor of claim 6, wherein the sensor further includes a rod having a first portion located within the hollow tube and attached to, but electrically isolated from the signal pickup, and a second portion extending outside of the hollow tube, the rod configured to move axially with the signal pickup, and wherein a first portion of the shielded wire is positioned inside the hollow tube and is electrically connected to the signal pickup, and a second portion of the shielded wire extends outside of the hollow tube.

12. The sensor of claim 1, wherein the shielded wire is a conducting wire of a coaxial cable, the coaxial cable including an electrically conductive shield and an insulating layer between the electrically conductive shield and the conducting wire.

13. The sensor of claim 12, wherein the electrically conductive shield is connected to an electrical ground.

14. The sensor of claim 1, wherein the signal pickup is configured to move axially along a portion of the outside of the resistive element.

15. The sensor of claim 14, wherein the signal pickup is a displacement collar.

16. The sensor of claim 1, wherein the resistive element comprises a resistive core.

17. The sensor of claim 1, wherein the resistive element comprises a resistive layer of a substantially uniform thickness on an outer surface of the resistive element.

18. A method for measuring displacement comprising:
    applying an alternating voltage having a substantially fixed amplitude to a first electrical terminal of a tubular resistive element and electrically grounding a second electrical terminal of the tubular resistive element, the first and second electrical terminals defining an axial length of the resistive element; and
    determining the position of a signal pickup in relation to the axial length of the resistive element based on an amplitude of an output signal obtained from the signal pickup, the signal pickup being capacitively coupled to, and moveable along, at least a portion of the axial length of the resistive element.

19. The method of claim 18, further comprising the step of:
measuring the amplitude of the output signal through a flexible electrostatically shielded wire, the wire electrically connected to the signal pickup and electrostatically shielded by a conductive shield forming a layer around, and insulated from, the wire, the conductive shield extending along a length of the wire, the length defined by a first position near the signal pickup and a second position near the signal output.

20. The method of claim 19, further comprising the step of:
moving the signal pickup along the portion of the axial length of the resistive element at a substantially fixed distance from the resistive element and without contact between the resistive element and the signal pickup.

21. The method of claim 18, wherein the resistive element has a circular cross-section.

22. A cylinder comprising:
a cylinder body forming a cylindrical hollow chamber for receiving a fluidic medium, the body comprising at least a resistive layer of a substantially uniform thickness, the resistive layer having a first and a second electrical terminal for receiving an alternating voltage;
a piston fitted to the inside the hollow chamber of the cylinder body and capacitively coupled to the resistive layer, the piston configured to be moved along at least a portion of the longitudinal axis of the cylinder body at a substantially fixed distance from the resistive layer and without contact between the resistive layer and the piston; and
a conducting element electrically connected to the piston for carrying a signal obtained from the piston, the signal having an amplitude proportional to a position of the piston with respect to the first and second electrical terminals of the resistive layer.

23. The cylinder of claim 22, further comprising an insulator between the piston and the resistive layer.

24. The cylinder of claim 23, wherein the insulator comprises a non-conductive tube inside the hollow chamber of the cylinder body, and the resistive layer comprises a resistance film deposited on the non-conductive tube.

25. The cylinder of claim 23, wherein the insulator is an insulating layer formed on an outer surface of the piston.

26. The cylinder of claim 23, wherein the cylinder further includes:
a hollow rod having a first portion located inside the cylindrical hollow chamber and attached to the piston, and a second portion extending outside of the cylindrical hollow chamber, the hollow rod configured to move axially with the piston, and wherein a first portion of the conducting element is positioned inside the first and second portions of the hollow rod, and a second portion of the conducting element extends outside of the hollow rod.

27. The cylinder of claim 26, wherein the hollow rod further comprises an insulating layer between the conducting element and the hollow rod.

28. The cylinder of claim 26, wherein at least the second portion of the conducting element is shielded by a conductive shield of a coaxial cable.

29. The cylinder of claim 26, wherein both the first and second portions of the conducting element are shielded by a conductive shield of a coaxial cable.

30. A system comprising:
a signal pickup capacitively coupled to a resistive rod, the signal pickup moveable along an axial length of the resistive rod, the axial length defined by a first electrical terminal and a second electrical terminal of the resistive rod;
a conductive element electrically coupled to the signal pickup for carrying a voltage signal sensed from the signal pickup to a signal output, the signal having an amplitude proportional to an axial position of the signal pickup with respect to the first and second electrical terminals; and
a conductive shield forming a layer around, and insulated from, the conductive element, the conductive shield extending along a length of the conductive element, the length defined by a first position near the signal pickup and a second position near the signal output.

31. The system of claim 30, wherein the resistive rod comprises a resistive core.

32. The system of claim 30, wherein the resistive rod comprises a resistive layer of a substantially uniform thickness on an outer surface of the resistive rod.

33. The system of claim 30, wherein the resistive rod has a circular cross-section.

34. The system of claim 30, wherein the signal pickup is a displacement collar.

35. A system comprising:
a tubular body forming a tubular hollow chamber for receiving a fluidic medium, the tubular body comprising at least a resistive layer of a substantially uniform thickness, the resistive layer having a first and a second electrical terminal for receiving an alternating voltage;
means for capacitively coupling to the resistive layer, the means for capacitively coupling fitted to the inside the hollow chamber of the tubular body, the means for capacitively coupling configured to be moved along at least a portion of the longitudinal axis of the tubular body at a substantially fixed distance from the resistive layer and without contact between the resistive layer and the means for capacitively coupling; and
means for carrying a signal obtained from the means for capacitively coupling, the means for carrying the signal electrically connected to the means for capacitively coupling, the signal having an amplitude proportional to a position of the piston with respect to the first and second electrical terminals of the resistive layer.

36. The system of claim 35, further comprising an insulator between the means for capacitively coupling and the resistive layer.

37. The system of claim 36, wherein the insulator comprises a non-conductive tube inside the hollow chamber of the tubular body, and the resistive layer comprises a resistance film deposited on the non-conductive tube.

38. The system of claim 36, wherein the insulator is an insulating layer formed on an outer surface of the means for capacitively coupling.

39. The system of claim 36, further comprising:
a hollow rod having a first portion located inside the tubular hollow chamber and attached to the means for capacitively coupling, and a second portion extending outside of the tubular hollow chamber, the hollow rod configured to move axially with the means for capacitively coupling, and wherein a first portion of the means for carrying a signal is positioned inside the first and second portions of the hollow rod, and a second portion of the means for carrying a signal extends outside of the hollow rod.

40. The system of claim 39, wherein the hollow rod further comprises an insulating layer between the means for carrying a signal and the hollow rod.

* * * * *

UNITED STATES PATENT AND TRADEMARK OFFICE
CERTIFICATE OF CORRECTION

PATENT NO.       : 7,521,921 B2  
APPLICATION NO.  : 11/259665  
DATED            : April 21, 2009  
INVENTOR(S)      : Zhu et al.

It is certified that error appears in the above-identified patent and that said Letters Patent is hereby corrected as shown below:

Col. 5, line 67: delete "104" and replace with --102--

Col. 9, line 33: delete "118" and replace with --114--

Col. 10, line 23: delete "508" and replace with --506--

Col. 13, line 25 claim 22: delete "inside the" and replace with --inside of the--

Signed and Sealed this

Thirtieth Day of June, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,521,921 B2
APPLICATION NO. : 11/259665
DATED : April 21, 2009
INVENTOR(S) : Zhu et al.

It is certified that error appears in the above-identified patent and that said Letters Patent is hereby corrected as shown below:

Column 1, Line 15, delete:
"The U.S. Government may have a paid-up license in this invention and the right in limited circumstances to require the patent owner to license to others on reasonable terms as provided for by the terms of Contract No. NS-0121663, awarded by the National Science Foundation."

and insert with the following paragraph:

--This invention was made with U.S. Government support under agreement no. IIS-0121663, awarded by the National Science Foundation. The Government has certain rights in this invention.--

Signed and Sealed this

Sixteenth Day of March, 2010

David J. Kappos
*Director of the United States Patent and Trademark Office*